United States Patent Office 2,966,038
Patented Dec. 27, 1960

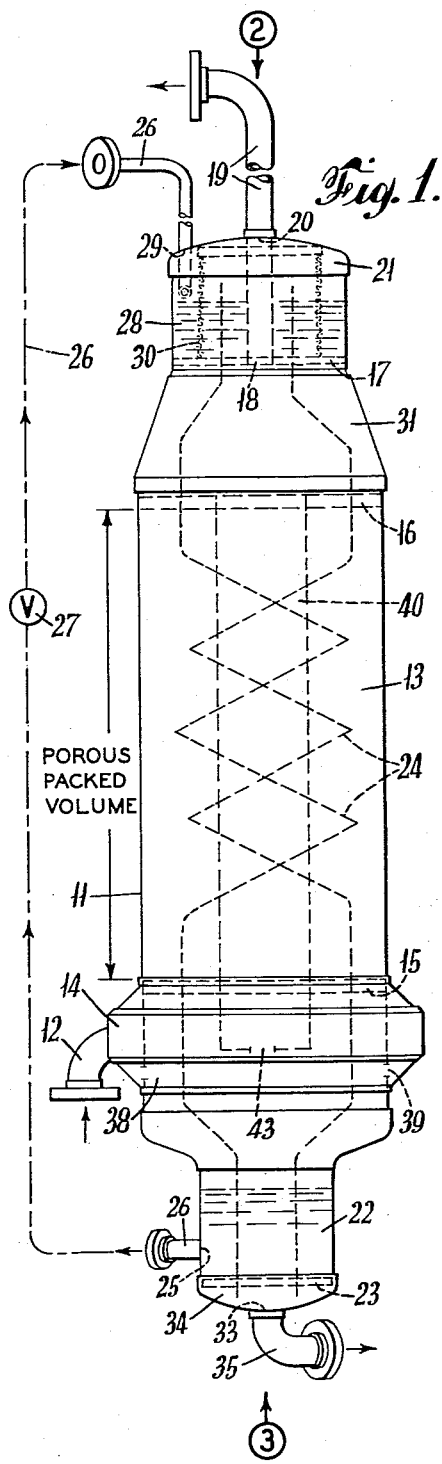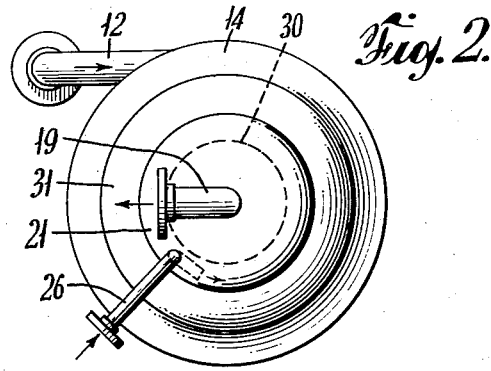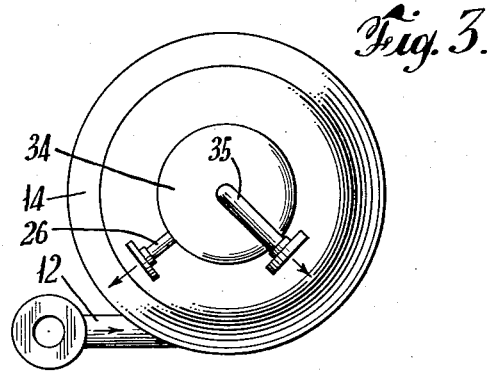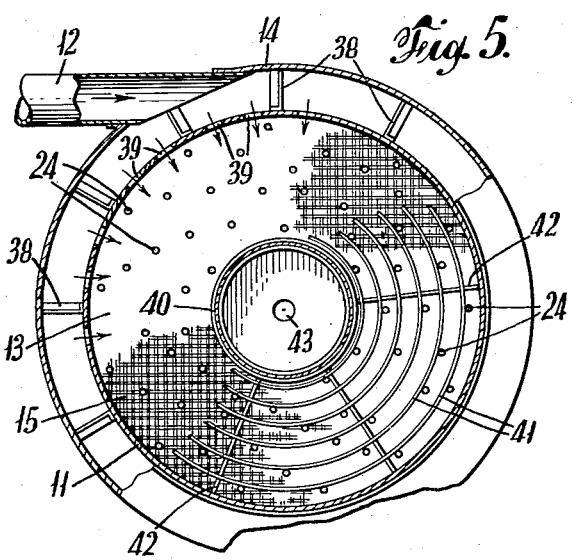

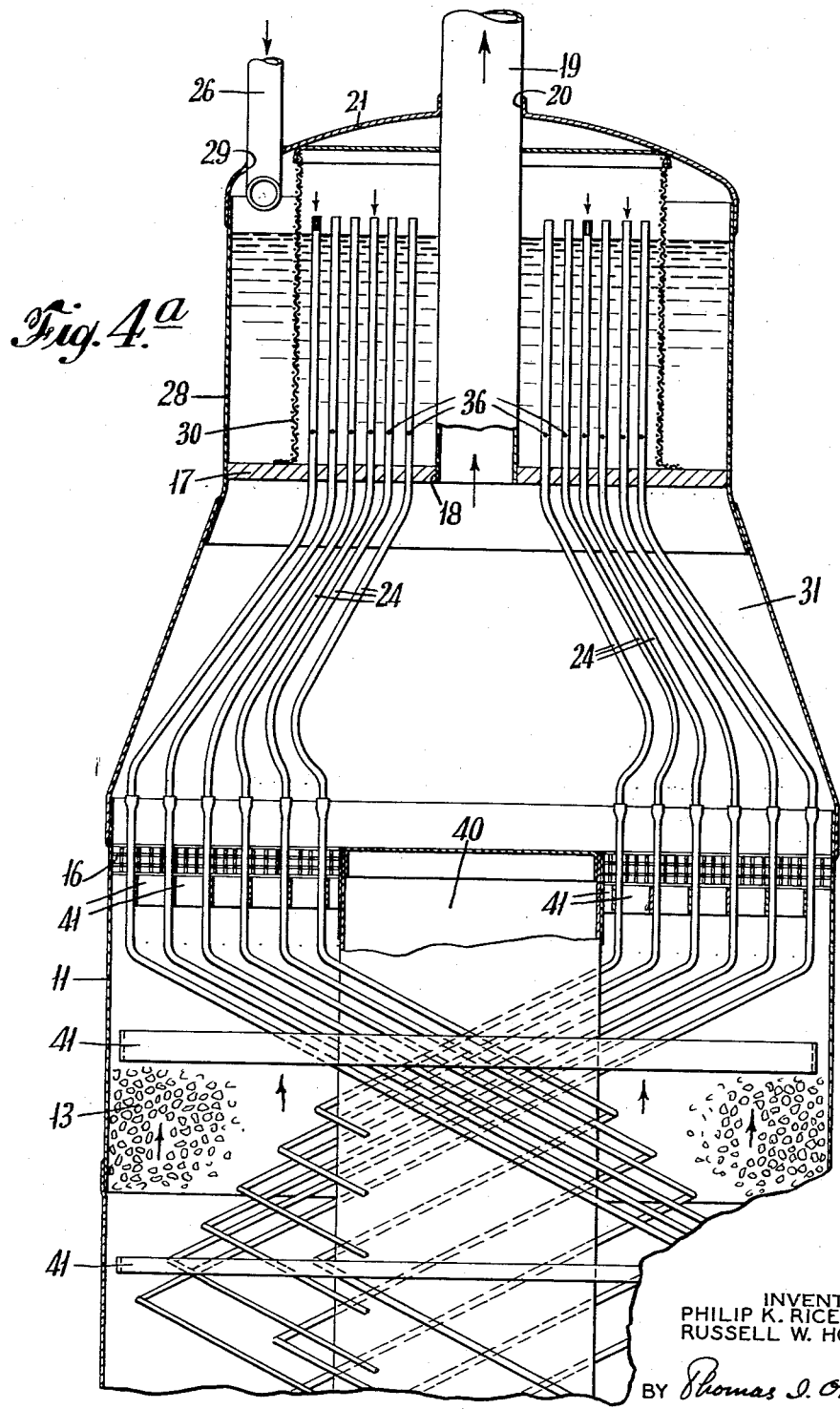

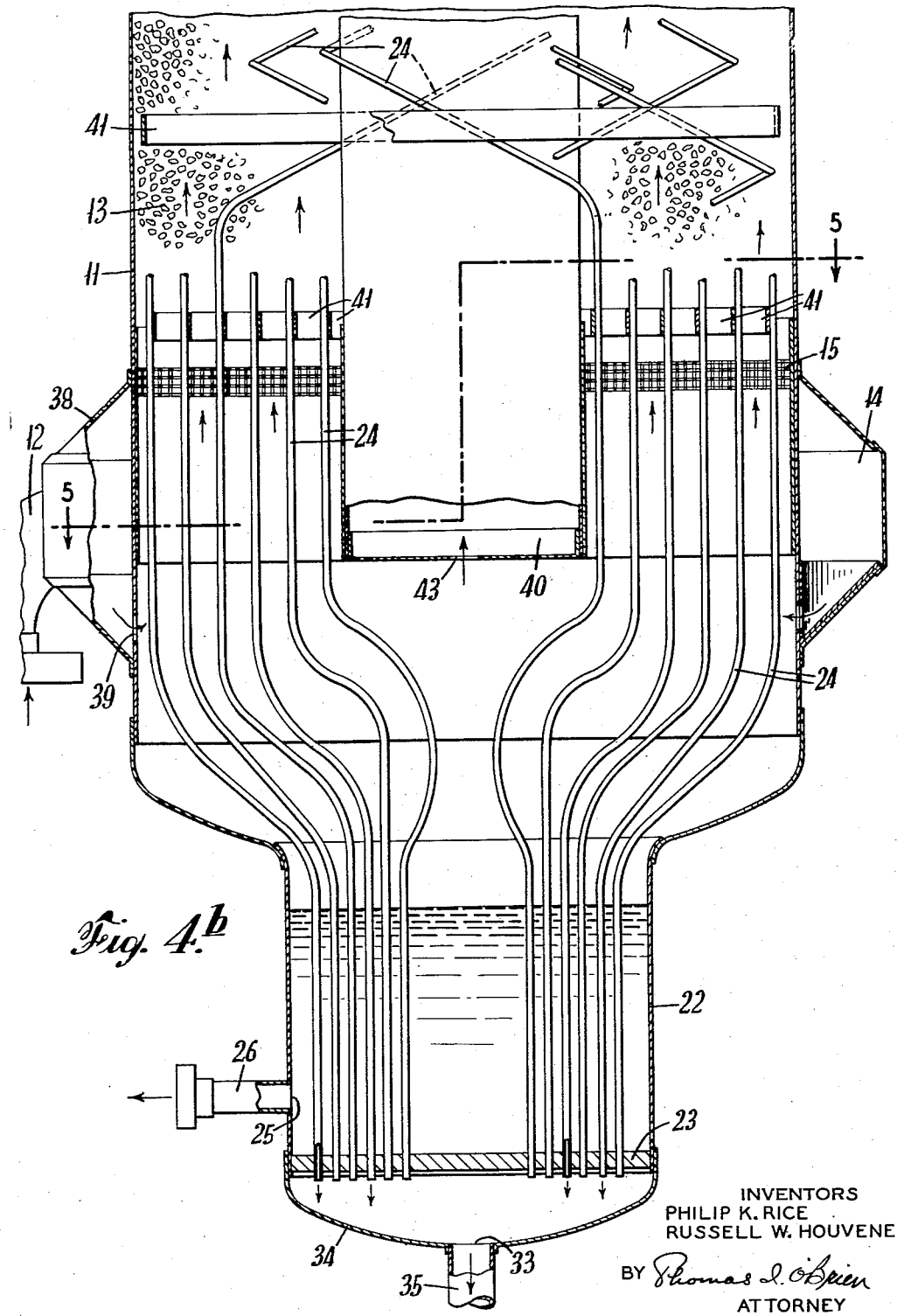

2,966,038

PROCESS AND APPARATUS FOR THE SEPARATION OF GAS MIXTURES

Philip K. Rice, White Plains, N.Y., and Russell W. Houvener, Marietta, Ohio, assignors to Union Carbide Corporation, a corporation of New York Filed Nov. 26, 1956, Ser. No. 624,411

16 Claims. (Cl. 62—34)

This invention relates to a process and apparatus for the separation of gaseous mixtures. More particularly, it relates to a highly efficient and economical system in which a gas mixture may be partially condensed and rectified into lower and higher boiling constituents. The invention is especially suited for the separation of air into components rich in oxygen and nitrogen, for example, 45 percent oxygen and 97 percent (or higher) nitrogen.

So-called "trickle condensers" for the production of low-purity 45 percent oxygen from air by low temperature condensation and rectification have been known for many years, and a basic trickle condenser process for air separation was taught by M. Fränkl, as disclosed in U.S.P. 1,963,840. However, the prior art trickle condensers have not been commercially adopted because of low efficiency and high investment costs. For example, if 45 percent oxygen is required as an oxygen-enriched air feed to the open hearth furnace of a steel plant, it has been found more economical to dilute high purity oxygen with air to the desired 45 percent oxygen than to use the formarly proposed trickle condensers to make 45 percent oxygen initially.

Basically, the trickle condenser process includes the steps of feeding low pressure air at or near its condensation temperature to the base of the trickle condenser condensing side, whereupon it rises and is partially condensed and rectified by the counterflow of the condensed liquid and rising vapor, the uncondensed portion being drawn off the top as 97 percent (or higher) nitrogen gas. The rectified liquid flowing to the base containing approximately 45 percent oxygen is throttled to a lower pressure and transferred to a liquid distribution means at the top of the trickle condenser from whence it flows downward cocurrently with its vapor through separate passageways or conduits until eventually completely vaporized, the vaporization providing the necessary refrigeration for partial condensation of the incoming air. After cocurrent evaporation, the 45 percent oxygen liquid is withdrawn from the bottom of the separate passageways as 45 percent oxygen gas.

The trickle condenser-cocurrent evaporator combination is a means of transferring heat with minimum irreversibility. An approach to reversible heat exchange is obtained because the descending evaporating liquid at first preferentially boils off more nitrogen than oxygen and its boiling temperature is lowest at the top of the separate passageways. The composition of the remaining liquid increases in oxygen so that the boiling temperature increases downwardly and is highest at the lower portions of the conduits. The ascending vapor on the condensing side gradually becomes richer in nitrogen so that its condensing temperature is highest at the lower end and lowest at the upper end. The net effect is a tendency towards constant temperature difference between the boiling liquid and the condensing vapor over the length of the rectification zone, which results in efficient heat transfer and low pressures. Also, the pressure difference can be substantially lower than in customary main condensers wherein boiling oxygen of highest purity must condense substantially pure nitrogen. The lower pressure difference permits a lower head pressure and consequently a power saving.

One serious problem in trickle condenser operation is obtaining intimate contact between liquid and vapor for efficient mass and heat exchange. Unless special arrangements are used, the liquid on both the condensing and evaporating sides will flow down the steep condenser-evaporator walls too rapidly for sufficient contact time with the vapor. One proposed prior art partial solution to this problem is a system in which the air enters on the shell side and the evaporating liquid passes through tubes inside the shell. Sheet metal strips in a U shape are used to press wire gauzes against the tube inner walls. The liquid flows down the tubes between the sheet-metal strips and the inner tube wall, and intimate mixing of the evaporating liquid and its vapor is obtained. This, however, does not provide intimate liquid-vapor contact on the incoming air shell side, or intimate heat exchange contact between the fluids on the shell and tube sides of the trickle condenser.

Another previously proposed system utilizes sheet metal insets in both the condensation and evaporation passageways. In the former, the insets are to drain the liquid away from the condensing surfaces and minimize the thickness of the liquid film on the condensing surface. In the evaporation passageways, the liquid is said to be conducted away from the walls by the insets and returned thereto by the shortest way. Thus, the evaporator walls are to be kept in a desirable moistened condition to accomplish intimate contact between the liquid and vapor. This system has an important disadvantage of high fabricating and investment costs.

A further disadvantage of such prior trickle condensers is liquid and vapor channeling on the air condensing side in the event of mal distribution of liquid on the evaporating side. Thus, in a shell-and-tube type trickle condenser in which the air enters on the shell side and liquid is evaporated on the tube side, a serious problem of condensing side liquid and vapor channeling might arise if one of the tubes becomes plugged, thus preventing the passage of liquid therein. The vapor rising through the shell in the immediate vicinity of the plugged tube would not be condensed and rectified due to the lack of refrigeration. Such a situation decreases the overall efficiency of the process.

A principal object of this invention is to provide a process of and apparatus for low temperature combined partial condensation and rectification of a gas mixture, said process having the characteristics of high efficiency and low investment cost.

Another object is to provide an improved process of and apparatus for low-temperature partial condensation and rectification of air into 45 percent oxygen and 97 percent (or higher) nitrogen, said process having high efficiency and low investment cost.

A further object is to provide a cocurrent evaporator, countercurrent condenser-rectifier in which the liquids and vapors processed therein are in intimate contact for efficient mass and heat exchange.

A still further object is to provide a device according to the invention which eliminates the possibility of liquid and vapor channelng on the condensing side in the event of mal distribution of liquid on the evaporating side.

With the above and other objects in view, as may appear hereinafter, reference is made to the accompanying drawings in which:

Fig. 1 is an elevational view of a device according to the invention in which the helical coil assembly for processing the throttled cocurrently evaporating liquid is represented schematically.

Fig. 2 is a top plan view of the same device looking downward from point 2 in Fig. 1.

Fig. 3 is a bottom view of the same device looking upward from point 3 in Fig. 1.

Fig. 4a is an enlarged view in cross section of the top part of the device illustrated in Fig. 1.

Fig. 4b is a corresponding view of a cross section through the bottom part of the device illustrated in Fig. 1.

Fig. 5 is a view of a section taken on line 5—5 of Fig. 4b.

It has been found that the efficiency of cocurrent evaporator, countercurrent condenser-rectifiers can be substantially improved by employing a porous packing on the condensing side for processing the incoming air to be partially condensed and rectified. The term "porous packing" as used in this specification and appended claims refers to packing material having a series of interconnecting continuous capillaries or pores. The evaporator, condenser-rectifier efficiency can be further improved by using helical coils embedded in the porous packing for processing the throttled 45 percent oxygen liquid to be cocurrently evaporated. The incoming air enters the bottom of the shell side of the device through a suitable distributor, rises through the porous packing, and is partially condensed on the outside of the coils. This condensate is drawn off the coils by the porous packing and is rectified by intimate contact with the rising incoming vapor as it flows down through the porous packed bed. There is thus provided sufficient liquid-vapor contact area for the descending liquid to become saturated with oxygen at the bottom of the vessel and be in oxygen-nitrogen phase equilibrium with the incoming cold air. At the same time, the rising vapor is rectified and most of its oxygen removed so that the top effluent is at least 97 percent nitrogen. To provide refrigeration for this partial condensation, the liquid collecting in the kettle, or bottom of the shell side is throttled in a transfer line and passed to the top of the vessel through a suitable distributor for downward cocurrent evaporation inside the helical coils. This evaporating liquid absorbs the latent heat of the vapor condensing on the outside, and the gaseous 45 percent oxygen is discharged from the bottom of the coils. This system removes the previously described disadvantages of the prior art trickle condensers; namely, insufficient contact between descending liquid and rising vapor, and channeling on the air condensing side in the event of mal distribution of liquid on the evaporating side. The process and apparatus of the present invention may, for example, be incorporated in a gas separation cycle of the general type disclosed by M. Fränkl in U.S.P. 2,084,334. In this cycle, incoming air is cooled in regenerators by outgoing products separated from the air in the trickle condenser.

The use of a porous packing material offers several advantages. It maintains a thin external liquid film on the condensing surface for efficient heat exchange, and due to its excellent "wetting" characteristics provides uniform liquid distribution across the bed with minimum liquid channeling. Porous packing also provides efficient liquid-vapor mass transfer by rectification.

A further significant advantage of porous packing as used in the present invention is the material's ability to draw or suck the condensing liquid as soon as it is formed from the helical coil surface by capillary action into the interconnecting pores of the porous packing. This action minimizes the thickness of the liquid film on the condensing surface and maximizes the overall heat transfer coefficient between the condensing air and the evaporating 45 percent oxygen liquid. If a standard type of packing, which is non-porous, were used, the liquid would merely drain off the coils by gravity, and heat would be ineffectively transferred through a relatively thick liquid film. Also, non-porous packings usually have poor "wetting" characteristics, which promote channeling.

Another advantage of porous packing in this particular application is its relatively poor mass conductance of heat, thus minimizing the longitudinal heat transfer between the warm and cold ends of the packed bed and eliminating the need for insulating layers across the packed bed at intervals between such ends.

Porous packing may be made of any suitable materials of construction, such as quartz, bonded metals, and bonded metal oxides, provided that the packing in its usable form consists of interconnected continuous capillaries or pores in the suitable pore size range to provide high efficiency with the liquid being rectified. A further requirement is that the packing must contain a sufficient number of pores to internally process the liquid capacity of the system in the desired packing volume. A preferred packing is alumina bonded with clay having a pore radii range of 25–105 microns, although the wider range of 10–400 microns is acceptable. It was also found that packing in the range of 8–12 mesh size is preferable for the previously described air separation system. An optimum particle size range exists for each system as the condensing film coefficient and the pressure drop both increase with decreasing porous packing particle size. The first characteristic is desirable and the second undesirable; hence the optimum particle size provides a balance between the two characteristics.

From the standpoint of investment and assembly cost, porous packing is substantially cheaper than any of the prior trickle condenser devices to achieve intimate contact between liquids and vapors for efficient mass and heat exchange. The porous packing material itself is reasonably priced and may be inserted in the trickle condenser by merely pouring the packing in the top of the vessel before attaching the head assembly.

One important advantage of the helical or serpentine coil bundle is its provision for uniform condensate distribution throughout the cross-sectional area of the porous packed bed. If a straight vertical tube bundle were used, a serious problem of condensing side liquid and vapor channeling might arise if one of the tubes becomes plugged and prevents or impedes the passage of liquid therein. The gas on the condensing side immediately surrounding the plugged tube would rise through the porous packed bed without substantial rectification because of insufficient refrigeration. Such a condition would reduce the overall efficiency of the air separation process. However, in the case of the helically wound coil bundle, the tubes adjacent to the plugged coil also supply condensate in the same vertical path as the plugged coil. This cooperates with the liquid distributing property of the packing and minimizes the effect of the plugged coil.

Other advantages of helical coils over straight tubes are to provide a higher heat transfer rate per unit heat exchange volume and lower fabricating costs for a given evaporating liquid flow.

The combination of porous packing and helical coils thus provides a device which is substantially more efficient and economical than previously known trickle condensers.

Although the invention is hereinafter described specifically in terms of air separation, it is applicable to any system where partial separation is desired for one product (or waste) and substantially complete separation for another product. An example is the separation of propane from propane-butane mixtures.

Referring to Fig. 1, a cocurrent evaporator, counter current condenser-rectifier according to the invention is illustrated with a helically wound coil bundle embedded in a porous packed bed. Cold clean air at low pressure for example, 21 p.s.i.g., and approximately saturation temperature at this pressure, e.g. minus 183° C., enters the shell side 11 through conduit 12 and rises into the porous packed section 13 through the bustle distributor assembly 14. The operation of this condenser-rectifier is functionally the same whether the air enters entirely in the vapor state, or is partially liquefied. The air is cooled and partially condensed in the packed section 13, the packing being held in the shell 11 between the lower and upper retaining screens 15 and 16 respectively. The condensate on the outer surface of the helical coils 24 is drawn off this condensing surface by the porous packing 13 as previously described. The condensate passes down through the porous packed bed 13 and is rectified by intimate contact with the incoming vapor rising through the shell 11. The uncondensed gas, by the time it reaches the upper header 17, contains very little of the higher boiling constituent oxygen, and may be 97 percent nitrogen, or higher. This effluent emerges through a pipe connection hole 18 in upper header 17 into pipe 19. The latter extends up through a pipe connection hole 20 in the metering pot header 21 which is gas-tightly metal-bonded to the pipe 19. The effluent nitrogen gas from pipe 19 may be processed as desired, for example, used to cool and clean incoming air in regenerators or reversing heat exchangers, with subsequent discharge to the atmosphere as waste gas or delivery to a consuming means as product gas.

Sufficient liquid-vapor contact area is provided in the porous packed section 13 so that the oxygen-enriched rectified liquid reaching the lower retaining screen 15 is substantially in oxygen-nitrogen phase equilibrium with the incoming air and may be, for example, 45 percent oxygen. This liquid passes downward through the lower retaining screen 15 into the kettle 22, the lower end of which is terminated by lower header 23.

The kettle liquid is continuously drawn off through a pipe connection hole 25 in the side of the kettle into liquid transfer conduit 26 which is leak-tightly metal-bonded to the kettle walls. A throttling valve 27 in the conduit 26 reduces the pressure of the 45 percent oxygen kettle liquid to approximately 3 p.s.i.g. after which the throttled liquid in conduit 26 enters the metering pot 28 at the top of the shell 11 through a pipe connection hole 29 in the pot, conduit 26 being leak-tightly metal-bonded to the metering pot 28 above the upper header 17. The throttled liquid in the metering pot 28 passes through a wire mesh screen 30 and is distributed to the upper end of the helical coils 24 through holes therein, above the upper header 17. The throttled liquid then passes down through the helical coil bundle 24 and is cocurrently evaporated therein by heat exchange with condensing vapor on the shell side of the condenser. A dummy core 40 fills up the central volume of the shell not occupied by the coils or tubes 24.

The descending evaporating liquid in the helical coil bundle 24 first exchanges heat with rising vapor in the unpacked top section 31 and subsequently exchanges heat with the rising partially or fractionally condensing vapor in the porous packed section 13 of the vessel. The evaporating liquid absorbs the latent heat of the condensing vapor and is preferably completely evaporated inside the helical coil bundle 24. This 45 percent oxygen gas in the helical coil bundle passes through the lower coil header 23 and emerges through a pipe connection hole 33 in the kettle header 34 into bottom outlet conduit 35 for processing as desired. As in the case of the effluent nitrogen, the 45 percent oxygen gas is normally used to cool and clean incoming air in regenerators or reversing heat exchangers, with subsequent discharge to the atmosphere as waste gas or delivery to a consuming means as product gas.

In practice, the unit is operated as a combination cocurrent evaporator-countercurrent condenser and conventional rectification column. Thus, in the upper part of the porous packed section 13, condensation occurs and reflux liquid is formed. Furthermore, in the upper part of the helical coil bundle 24, the liquid is being evaporated and true cocurrent evaporator-countercurrent condenser operation exists as substantial heat is transferred through the coil walls. However, in the lower part of the porous packed section 13, the unit behaves as a conventional packed rectification column as the reflux liquid for this lower section comes substantially entirely from the upper section. Very little heat is transferred across the helical coil walls in the lower section after the liquid has completely evaporated. The entering air temperature should be about the same as boiling temperature of 45 percent oxygen for most efficient operation.

Referring now to Fig. 2, a top plan view of the same device as shown in Fig. 1, the air from inlet pipe 12 enters the bustle distributor assembly 14 and is distributed across the base of the porous packed section 13. The air rising therein is partially condensed and rectified, the top effluent emerging through conduit 19 in the metering pot header 21. The kettle liquid is throttled and transferred through conduit 26 to the metering pot, through the screen 30 and hence to the helical coil bundle inlets.

Fig. 3 is a bottom plan view of the Fig. 1 device according to the invention, wherein the air from inlet pipe 12 enters the bustle distributor assembly 14, the kettle liquid emerges through conduit 26 and the 45 percent gaseous oxygen product discharges in conduit 35.

Fig. 4a elevation shows important details of the internal structure. The throttled kettle liquid enters the metering pot 28 through pipe connection hole 29 in the metering pot header 21. This liquid passes through a wire mesh screen 30 preventing passage of particles which might plug up the orifices 36 in the evaporating coils 24. These orifices are preferably of uniform size and positioned in the tube walls in the same horizontal plane above the upper coil or tube header 17, and the liquid is metered through these orifices into each tube. The tubes extend above the orifices and the metering pot liquid level. The upper end of the tubes is left open to admit any vapor formed by throttling the kettle liquid from the condensing to the evaporating pressure, and also to assure that equal pressure drop is maintained across all of the orifices 36. This arrangement provides a uniform head of liquid above the equally sized orifices and, therefore, equal distribution of the throttled kettle liquid to the tubes which is essential to high efficiency operation. The tubes 24 are preferably substantially equally spaced across the diameter of the upper tube header 17 and the upper retaining screen 16. The helical coils 24 in the porous packed section 13 are positioned substantially equally distant apart by tube bands 41 concentrically located around the dummy core 40, the helical coils being metal tacked to the tube bands for rigidity.

Fig. 4b shows important details of the bustle distributor assembly. The air feed from conduit 12 is admitted to the shell tangentially through an external annular bustle 14 immediately below the porous packed section 13. The bustle is provided with a plurality of equally-spaced triangular radial baffles 38 to change the direction of flow from circular to radial. The air then enters the condensing side through a plurality of equally spaced ports 39 cut in the shell 11. In this manner the air is equally distributed across the base of the packed section 13 which is essential to high efficiency operation. A hole 43 is cut in the dummy core 40 to prevent the buildup of a pressure differential across the core.

As shown in Fig. 5, the helical coils are substantially evenly distributed across the porous packed cross-sectional area and maintained in place by the previously described concentric tube bands 41. These bands are preferably also metal tacked to ribs 42 for rigidity, the ribs being metal tacked to the shell 11 and the dummy core 40 at opposite ends. The ribs 42 may be placed at suitable intervals around the circumference of the shell to provide the desired rigidity.

Oxygen-enriched air of any composition up to approximately 45 percent oxygen may be produced with this invention, the upper limit being the oxygen concentration of the kettle liquid in equilibrium with the incoming air. The corresponding nitrogen effluent purity in this case is approximately 98 percent. If desired, the apparatus may alternatively be operated so as to produce high purity nitrogen, e.g. 99.98 percent, by, for example, reducing the nitrogen effluent discharge rate. In such a case, the corresponding purity of the oxygen-enriched air would be reduced to approximately 39.3 percent oxygen.

Although the previously described means for distributing the cold air feed and kettle liquid to the bottom and top respectively of the invention are the preferred methods, they are not the only practical arrangements. The basic requirement is that the fluids be uniformly distributed across the base of the porous packed section (in the case of the cold air feed) and to the evaporating coils (in the case of the throttled kettle liquid) so that the mass and heat transfer operations may be conducted most efficiently.

The air head pressure, or operating pressure of the condensing side of the device is determined primarily by the pressure at which the nitrogen and oxygen-enriched air products are desired, but the pressure differential between the incoming air on the condensing side and the liquid on the evaporating side must be sufficient to provide the required temperature differential between the two streams for efficient heat transfer. Practically speaking, the preferred air head pressure range is under 30 p.s.i.g. It is also feasible to operate the evaporating side under a vacuum by attaching a vacuum pump to the oxygen-enriched air discharge conduit 35 and drawing or sucking this gas from the bottom of the device.

What is claimed is:

1. In a process for the low-temperature separation of a gas mixture wherein the gas to be separated is provided at a predetermined low pressure and cooled to substantially saturation temperature at such low pressure, the steps including passing the low pressure gas mixture to a warmer lower part of a condensation-rectification zone, partially condensing said low pressure gas mixture in said condensation-rectification zone by indirect heat exchange with a colder fluid to form a liquid film on a condensing surface, drawing the condensate of the partial condensation away from the condensing surface in a lateral direction as soon as it is formed to minimize the thickness of liquid film on such surface, and rectifying such laterally drawn off condensate with incoming low pressure gas mixture to form an effluent gas enriched in the lower boiling constituents and a kettle liquid enriched in the higher boiling constituents.

2. In a process for the low-temperature separation of a gas mixture wherein the gas to be separated is provided at a predetermined low pressure and cooled to substantially saturation temperature at such low pressure, the steps including passing the low pressure gas mixture to a warmer lower part of a condensation-rectification zone, partially condensing said low-pressure gas mixture in said condensation-rectification zone by indirect heat exchange with a colder fluid to form a liquid film on a condensing surface, drawing the condensate of the partial condensation away from the condensing surface in a lateral direction as soon as it is formed to minimize the thickness of liquid film on such surface, rectifying such laterally drawn off condensate with incoming low-pressure gas mixture to form an effluent gas enriched in the lower boiling constituents and a kettle liquid enriched in the higher boiling constituents, discharging said kettle liquid from a warmer part of said condensation-rectification zone, providing said colder fluid by throttling the discharged kettle liquid from said predetermined low pressure to a second lower pressure and passing this liquid in heat exchange contact with the condensing surface from the colder to the warmer part of said condensation-rectification zone.

3. In a process for the low-temperature separation of a gas mixture wherein the gas to be separated is provided at a predetermined low pressure and cooled to substantially saturation temperature at such low pressure, the steps including passing the low pressure gas mixture to a warmer lower part of a condensation-rectification zone, partially condensing said low-pressure gas mixture in said condensation-rectification zone by indirect heat exchange with a colder fluid to form a liquid film on a condensing surface, drawing the condensate of the partial condensation away from the condensing surface in a lateral direction as soon as it is formed to minimize the thickness of liquid film on such surface, rectifying such laterally drawn off condensate with incoming low-pressure gas mixture to form an effluent gas enriched in the lower boiling constituents and a kettle liquid enriched in the higher boiling constituents, discharging said kettle liquid from a warmer part of said condensation-rectification zone, providing said colder fluid by throttling the discharged kettle liquid from said predetermined low pressure to a second lower pressure and passing this liquid in heat exchange contact with the condensing surface from the colder to the warmer part of said condensation-rectification zone, cocurrently evaporating the throttled kettle liquid in said heat exchange contact, and discharging the evaporated liquid as gaseous product enriched in the higher boiling constituents of said gas mixture.

4. In a process for the low-temperature separation of air wherein air to be separated is provided at a predetermined low pressure below 30 p.s.i. and cooled to substantially saturation temperature at such low pressure; the steps including passing the low pressure air upwardly through a condensation-rectification zone, partially condensing said low pressure air in said condensation-rectification zone by indirect heat exchange contact with a colder fluid to form a liquid film on a condensing surface, drawing the condensate from the partial condensation away from the condensing surface in a lateral direction as soon as it is formed to minimize the thickness of liquid film on such surface, and rectifying said condensate with incoming air to form a nitrogen-rich effluent gas and an oxygen-enriched kettle liquid.

5. In a process for the low-temperature separation of air wherein air to be separated is provided at a predetermined low pressure below 30 p.s.i. and cooled to substantially saturation temperature at such low pressure; the steps including passing the low pressure air upwardly through a condensation-rectification zone, partially condensing said low pressure air in said condensation-rectification zone by indirect heat exchange contact with a colder fluid to form a liquid film on a condensing surface, drawing the condensate from the partial condensation away from the condensing surface in a lateral direction as soon as it is formed to minimize the thickness of the liquid film, rectifying said condensate with incoming air to form a nitrogen-rich effluent gas and an oxygen-enriched kettle liquid, discharging the oxygen-enriched kettle liquid from a warmer part of said condensation-rectification zone, providing said colder fluid by throttling the discharged oxygen-enriched kettle liquid from said predetermined low pressure to a second lower pressure and passing this liquid in heat exchange contact with the condensing surface from the colder to the warmer part of said condensation zone.

6. In a process for the low-temperature separation of air wherein air to be separated is provided at a predetermined low pressure below 30 p.s.i. and cooled to substantially saturation temperature at said low pressure; the steps including passing the low pressure air upwardly through a condensation-rectification zone, partially condensing said low pressure air in said condensation-rectification zone by indirect heat exchange contact with a colder fluid to form a liquid film on a condensing surface, drawing the condensate from the partial condensation away from the condensing surface in a lateral direction as soon as it is formed to minimize the thickness of the liquid film, rectifying said condensate with incoming air to form a nitrogen-rich effluent gas and an oxygen-enriched kettle liquid, discharging the nitrogen-rich effluent gas from a colder part of said condensation zone, discharging the oxygen-enriched kettle liquid from a warmer part of said condensation-rectification zone, providing said colder fluid by throttling the discharged oxygen-enriched kettle liquid from said predetermined low pressure to a second lower pressure and passing this liquid in heat exchange contact with the condensing surface from the colder to the warmer part of said condensation-rectification zone, cocurrently evaporating the throttled oxygen-enriched kettle liquid in said heat exchange contact, and discharging the evaporated liquid as gaseous oxygen-enriched air product.

7. Apparatus for the low-temperature separation of a gas mixture including a condensation-rectification column, a bed of porous packed material of low thermal conductivity within such column having a series of interconnecting continuous capillaries, a plurality of separate conduits disposed within the porous packed bed and extending from a colder part to a warmer part thereof for passage of a colder fluid therein, and means for passing cold gas mixture at a predetermined low pressure to the warmer part of said porous packed bed for passage through the bed as well as partial condensation and rectification therein by indirect heat exchange with said colder fluid in said plurality of separate conduits and direct mass and heat exchange with incoming cold gas mixture to form an effluent gas enriched in the lower boiling constituents and a kettle liquid enriched in the higher boiling constituents.

8. Apparatus for the low-temperature separation of a gas mixture including a condensation-rectification column, a bed of porous packed material of low thermal conductivity within such column having a series of interconnecting continuous capillaries, a plurality of separate conduits disposed within the porous packed bed and extending from a colder part to a warmer part thereof for passage of a colder fluid therein, means for passing cold gas mixture at a predetermined low pressure to the warmer part of said porous packed bed for passage through the bed as well as partial condensation and rectification therein by indirect heat exchange with said colder fluid in said plurality of separate conduits and direct mass and heat exchange with incoming cold gas mixture to form an effluent gas enriched in the lower boiling constituents and a kettle liquid enriched in the higher boiling constituents, and means for throttling said kettle liquid from said predetermined low pressure to a second lower pressure to serve as said colder fluid.

9. Apparatus for the low-temperature separation of a gas mixture including a condensation-rectification column, a bed of porous packed material of low thermal conductivity within such column having a series of interconnecting continuous capillaries and a plurality of helical coils disposed within the porous packed bed and extending from a colder part to a warmer part thereof for passage of a colder fluid therein, means for passing cold gas mixture at a predetermined low pressure to the warmer part of said porous packed bed for passage through the bed as well as partial condensation and rectification therein by indirect heat exchange with said colder fluid in said helical coils and direct mass and heat exchange with incoming cold gas mixture to form an effluent gas enriched in the lower boiling constituents and a kettle liquid enriched in the higher boiling constituents.

10. Apparatus for the low-temperature separation of a gas mixture including a condensation-rectification column, a bed of porous packed material of low thermal conductivity within such column having a series of interconnecting continuous capillaries, a plurality of separate conduits disposed within the porous packed bed and extending from a colder part to a warmer part thereof for passage of a colder fluid therein, a gas distributor at the warmer end of the bed serving to uniformly direct gas across and into such bed, means for introducing cold gas mixture at a predetermined low pressure to said gas distributor for passage through the bed as well as partial condensation and rectification therein by indirect heat exchange with a colder fluid in said plurality of separate conduits and direct mass and heat exchange with incoming cold gas mixture to form an effluent gas enriched in the lower boiling constituents and a kettle liquid enriched in the higher boiling constituents, means for throttling said kettle liquid from the warmer part of said porous packed bed from said predetermined low pressure to a second lower pressure, and means for passing the throttled kettle liquid into the colder end of said plurality of separate conduits as said colder fluid.

11. Apparatus for the low-temperature separation of a gas mixture including a condensation-rectification column, a bed of porous packing material of low thermal conductivity within such column for partial condensation and rectification of a cold gas mixture therein, said bed having a series of interconnecting continuous capillaries, a plurality of separate conduits disposed within the porous packed bed and extending from a colder part to a warmer part thereof for cocurrent evaporation of a colder fluid therein by indirect heat exchange with said cold gas mixture, means for passing said cold gas mixture at a predetermined low pressure to the warmer part of said porous packed bed for passage through the bed as well as partial condensation and rectification therein by indirect heat exchange with said colder fluid in said plurality of separate conduits and direct mass and heat exchange with incoming cold gas mixture to form an effluent gas enriched in the lower boiling constituents and a kettle liquid enriched in the higher boiling constituents, means for throttling said kettle liquid from the warmer part of said porous packed bed from said predetermined low pressure to a second lower pressure, means for passing the throttled kettle liquid into the colder end of said plurality of separate conduits as said colder fluid which is cocurrently evaporated therein, and means for discharging the cocurrently evaporated colder fluid from the warmer end of said separate conduits.

12. Apparatus for the low-temperature separation of air including a condensation-rectification column, a bed of porous packing material of low thermal conductivity within such column having a series of interconnecting continuous capillaries, a plurality of separate conduits disposed within the porous packed bed and extending from a colder part to a warmer part thereof for passage of a colder fluid therein, means for passing cold air at a predetermined low pressure to the warmer part of said porous packed bed for passage through the bed as well as partial condensation and rectification therein by indirect heat exchange with said colder fluid in said plurality of separate conduits and direct mass and heat exchange with incoming cold air to form an effluent nitrogen-rich gas and an oxygen-enriched kettle liquid, means for throttling the kettle liquid from the warmer part of said porous packed bed from said predetermined low pressure to a second lower pressure, and means for passing the throttled kettle liquid into the colder end of said plurality of separate conduits as said colder fluid.

13. Apparatus for the low-temperature separation of air including a condensation-rectification column, a bed of porous packing material of low thermal conductivity within such column having a series of interconnecting continuous capillaries, a plurality of helical coils disposed within the porous packed bed and extending from a colder part to a warmer part thereof for passage of a colder fluid therein, means for passing cold air at a predetermined low pressure to the warmer part of said porous packed bed for passage through the bed as well as partial condensation and rectification therein by indirect heat exchange with said colder fluid in said plurality of helical coils and direct mass and heat exchange with incoming cold air to form an effluent nitrogen-rich gas and an oxygen-enriched kettle liquid, means for throttling such kettle liquid from the warmer part of said porous packed bed from said predetermined low pressure to a second lower pressure, and means for passing the throttled kettle liquid into the colder end of said plurality of helical coils as said colder fluid.

14. Apparatus for the low-temperature separation of air including a condensation-rectification column, a bed of porous packing material of low thermal conductivity within such column for partial condensation and rectification of cold air therein, said bed having a series of interconnecting continuous capillaries, a plurality of helical coils disposed within the porous packed bed and extending from a colder part to a warmer part thereof for cocurrent evaporation of a colder fluid therein by indirect heat exchange with said cold air, a gas distributor at the warmer end of the bed serving to uniformly direct air across and into such bed, means for introducing cold air at a predetermined low pressure to said gas distributor for passage through the bed as well as partial condensation and rectification therein by indirect heat exchange with said colder fluid in said plurality of helical coils and direct mass and heat exchange with incoming cold air to form an effluent nitrogen rich gas and an oxygen-enriched kettle liquid, means for throttling such kettle liquid from the warmer part of said porous packed bed from said predetermined low pressure to a second lower pressure, means for passing the throttled kettle liquid into the colder end of said plurality of helical coils as said colder fluid which is cocurrently evaporated in the helical coils, and means for discharging the cocurrently evaporated colder fluid from the warmer end of said plurality of helical coils.

15. Apparatus for the low-temperature separation of air including a condensation-rectification column, a bed of porous packing material of low thermal conductivity within such column for partial condensation and rectification of cold air therein, said bed having a series of interconnecting continuous capillaries, a plurality of helical coils disposed within the porous packed bed and extending from a colder part to a warmer part thereof for cocurrent evaporation of a colder fluid therein by indirect heat exchange with said cold air, a gas distributor at the warmer end of the bed serving to uniformly direct said cold air across and into such bed, a liquid distributor at the colder end of the bed serving to uniformly distribute said colder fluid to said helical coils, means for introducing said cold air at a predetermined low pressure to said gas distributor for passage through the bed as well as partial condensation and rectification therein by indirect heat exchange with a colder fluid in said plurality of helical coils and direct mass and heat exchange with incoming cold air to form an effluent nitrogen-rich gas and an oxygen-enriched kettle liquid, means for throttling such kettle liquid from the warmer part of said porous packed bed from said predetermined low pressure to a second lower pressure, means for passing the throttled kettle liquid to said liquid distributor as said colder fluid which is cocurrently evaporated in the helical coils, and means for discharging the cocurrently evaporated colder fluid from the warmer end of said plurality of helical coils.

16. Apparatus for the low-temperature separation of air including a condensation-rectification column, a bed of porous packing material of low thermal conductivity within such column for partial condensation and rectification of cold air therein, said bed having a series of interconnecting capillaries with radii in the range of about 25 to 105 microns, a plurality of helical coils disposed within the porous packed bed and extending from a colder part to a warmer part thereof for cocurrent evaporation of a colder fluid therein by indirect heat exchange with said cold air, a gas distributor at the warmer end of the bed serving to uniformly direct cold air across and into such bed, a liquid distributor at the cold end of the bed serving to uniformly distribute said colder fluid to said helical coils, means for introducing cold air at a predetermined low pressure to the gas distributor for passage through the bed as well as partial condensation and rectification therein by indirect heat exchange with said colder fluid in said plurality of helical coils and direct mass and heat exchange with incoming cold air to form an effluent nitrogen-rich gas and an oxygen-enriched kettle liquid, means for throttling such kettle liquid from the warmer part of said porous packed bed from said predetermined low pressure to a second lower pressure, means for passing the throttled kettle liquid to said liquid distributor as said colder fluid which is cocurrently evaporated in the helical coils, and means for discharging the cocurrently evaporated colder fluid from the warmer end of said plurality of helical coils.

References Cited in the file of this patent

UNITED STATES PATENTS

| | | |
|---|---|---|
| 950,436 | Claude | Feb. 22, 1910 |
| 1,518,255 | Dodds | Dec. 9, 1924 |
| 1,518,377 | Vuilleumier | Dec. 9, 1924 |
| 1,963,840 | Frankl | June 19, 1934 |